(12) United States Patent
Hwang

(10) Patent No.: US 10,205,882 B2
(45) Date of Patent: Feb. 12, 2019

(54) METHOD FOR PROVIDING SERVICE AND ELECTRONIC DEVICE THEREOF

(71) Applicant: Samsung Electronics Co., Ltd., Gyeonggi-do (KR)

(72) Inventor: Min-Kyung Hwang, Seoul (KR)

(73) Assignee: Samsung Electronics Co., Ltd (KR)

(*) Notice: Subject to any disclaimer, the term of this patent is extended or adjusted under 35 U.S.C. 154(b) by 358 days.

(21) Appl. No.: 14/720,256

(22) Filed: May 22, 2015

(65) Prior Publication Data
US 2015/0347853 A1 Dec. 3, 2015

(30) Foreign Application Priority Data

May 27, 2014 (KR) .................. 10-2014-0063830

(51) Int. Cl.
| | |
|---|---|
| *G06T 15/00* | (2011.01) |
| *H04N 5/232* | (2006.01) |
| *G06K 9/00* | (2006.01) |

(52) U.S. Cl.
CPC ..... *H04N 5/23293* (2013.01); *G06K 9/00664* (2013.01); *H04N 5/232* (2013.01); *H04N 5/23229* (2013.01)

(58) Field of Classification Search
CPC ............ H04N 5/23293; H04N 5/232; H04N 5/23229; G06K 9/00664; G08B 13/19621; G08B 25/016; F41G 3/165; G06F 1/1686
See application file for complete search history.

(56) References Cited

U.S. PATENT DOCUMENTS

| | | | | |
|---|---|---|---|---|
| 6,152,854 | A * | 11/2000 | Carmein | A63B 22/025 482/4 |
| 2004/0203863 | A1* | 10/2004 | Huomo | H04W 4/02 455/456.1 |
| 2012/0293506 | A1* | 11/2012 | Vertucci | G06F 3/012 345/419 |
| 2013/0083173 | A1* | 4/2013 | Geisner | G06F 3/013 348/51 |
| 2013/0286004 | A1* | 10/2013 | McCulloch | G06T 19/006 345/419 |
| 2014/0002444 | A1* | 1/2014 | Bennett | G06F 3/012 345/419 |
| 2014/0139686 | A1* | 5/2014 | Shih | H04N 5/232 348/169 |

(Continued)

FOREIGN PATENT DOCUMENTS

KR 10-2007-0060617 6/2007

*Primary Examiner* — Sathyanaraya V Perungavoor
*Assistant Examiner* — Howard D Brown, Jr.
(74) *Attorney, Agent, or Firm* — The Farrell Law Firm, P.C.

(57) ABSTRACT

A method of an electronic device and an electronic device are provided. The method includes acquiring at least one captured image; determining a place corresponding to the at least one captured image by comparing the at least one captured image to at least one designated image; and performing at least one function in response to the determined place. The electronic device includes a memory configured to store a captured image; and at least one processor configured to acquire at least one captured image, determine a place corresponding to the captured image by comparing the captured image to at least one designated image, and perform at least one function in response to the determined place.

18 Claims, 14 Drawing Sheets

(56) References Cited

U.S. PATENT DOCUMENTS

| | | | |
|---|---|---|---|
| 2014/0268356 A1* | 9/2014 | Bolas | G02B 27/0093 359/630 |
| 2014/0361976 A1* | 12/2014 | Osman | G02B 27/0172 345/156 |
| 2015/0002676 A1* | 1/2015 | Yoo | G02B 27/017 348/159 |
| 2015/0097768 A1* | 4/2015 | Holz | G06F 3/017 345/156 |
| 2016/0054837 A1* | 2/2016 | Stafford | G06F 3/012 463/33 |
| 2016/0371983 A1* | 12/2016 | Ronning | G08G 1/168 |

* cited by examiner

METHOD FOR PROVIDING SERVICE AND ELECTRONIC DEVICE THEREOF

PRIORITY

This application claims priority under 35 U.S.C. § 119(a) to Korean Patent Application Serial No. 10-2014-0063830, filed on May 27, 2014 in the Korean Intellectual Property Office, the entire content of which is incorporated herein by reference.

BACKGROUND

1. Field of the Invention

The present invention relates generally to a method of providing a service in an electronic device, and an electronic device thereof, and more particularly, to an electronic device for determining a place where the electronic device is located based on a captured image and information relating to the image.

2. Description of the Related Art

An electronic device may be configured to allow a user to perform a desired operation at a particular place. An electronic device may determine the location thereof through at least one of a Global Positioning System (GPS) device, a Wireless Fidelity (Wi-Fi) device, and a Bluetooth (BT) device and provide a designated function that can be performed at the place where the electronic device is located in response to a location configured based on the location of the electronic device. In the execution of the designated function, the electronic device may provide a function of a running application, or a configured function that can be performed in relation to the application.

A method of identifying location information using a GPS in an electronic device to discover the electronic device outdoors. However, a significant error occurs when doing the same indoors, due to significant signal interference. In addition, a method of using Wi-Fi or Bluetooth requires multiple Wi-Fi devices or Bluetooth devices and a separate system for measuring a location.

SUMMARY

The present invention has been made to provide at least the advantages described below.

Accordingly, an aspect of the present invention is to provide an electronic device for determining a place where the electronic device is located based on a captured image and information relating to the image.

In accordance with an aspect of the present invention, a method of an electronic device is provided. The method includes acquiring at least one captured image, determining a place corresponding to the at least one captured image by comparing the at least one captured image to at least one designated image, and performing at least one function in response to the determined place.

In accordance with another aspect of the present invention, an electronic device is provided. The electronic device includes a memory configured to store a captured image; and at least one processor configured to acquire at least one captured image, determine a place corresponding to the captured image by comparing the captured image to at least one designated image, and perform at least one function in response to the determined place.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
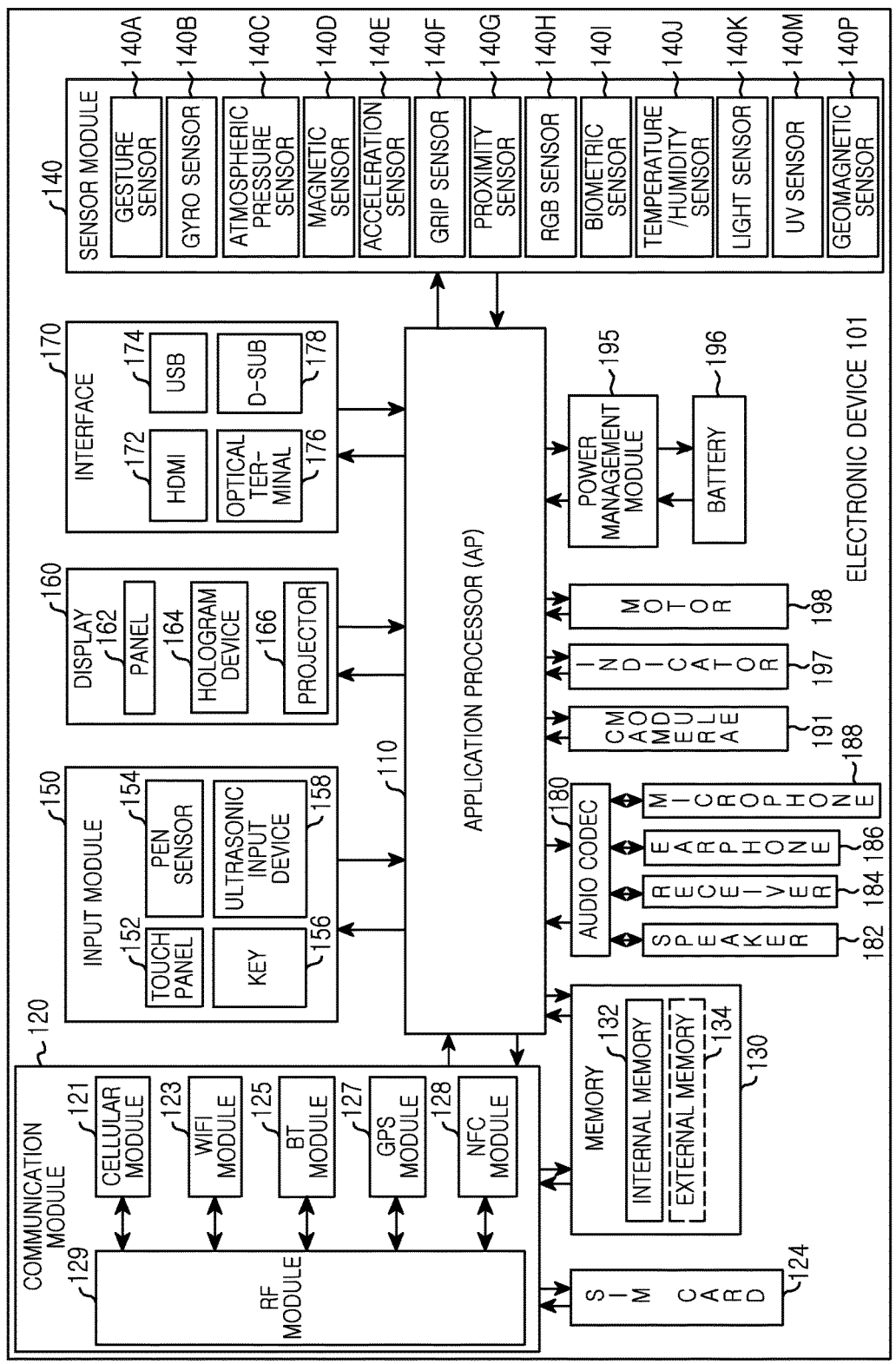
FIG. 1 is a block diagram of an electronic device according to an embodiment of the present invention.

Hereinafter, various embodiments of the present invention are described with reference to the accompanying drawings.

The present invention may have various embodiments, and modifications and changes may be made therein. Therefore, the present invention is described in detail with reference to certain embodiments shown in the accompanying drawings. However, it should be understood that the present invention is not limited to the embodiments of the present invention, but the present invention includes all modifications, equivalents, and alternatives within the scope and spirit of the present invention. In describing the drawings, similar reference numerals may be used to designate similar constituent elements.

As used herein, the expression "include" or "may include" refers to the existence of a corresponding function, operation, or element, but does not exclude one or more additional functions, operations, or elements. Further, as used in the present disclosure, the terms "include," "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in the present disclosure, the expression "or" includes any or all combinations of words enumerated together. For example, the expression "A or B" may include A, B, or both A and B.

As used in the present disclosure, the expressions "first," "second," and the like may modify various elements in the present invention, but do not limit the sequence and/or importance of corresponding elements. The above expressions may be used merely for the purpose of distinguishing one element from another elements.

When an element is referred to as being "coupled" or "connected" to another element, it should be understood that the element may not only be coupled or connected directly to the other element, but a third element may also be interposed therebetween. In contrast, when an element is referred to as being "directly coupled" or "directly connected" to another element, it should be understood that no element is interposed therebetween.

The terms as used in the present disclosure are merely for the purpose of describing certain embodiments of the present invention and are not intended to limit the present invention. As used herein, singular forms include plural forms as well, unless the context explicitly indicates otherwise. Further, all of the terms used herein, including technical terms and scientific terms, should be interpreted to have the same meanings as commonly understood by those skilled in the art to which the present invention pertains, and should not be interpreted to have ideal or excessively formal meanings unless explicitly defined in various embodiments of the present invention.

An electronic device according to an embodiment of the present invention may be a device including a communication function. An electronic device according to an embodiment of the present invention may, for example, include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, a wearable device (e.g., a Head-Mounted-Device (HMD) such as electronic glasses, electronic clothing, an electronic bracelet, an electronic necklace, an electronic appcessory, an electronic tattoo, or a smart watch), a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, a Television (TV), an electronic dictionary, an electronic key, a camcorder, medical equipment (e.g., a Magnetic resonance Angiography (MRA) machine, a Magnetic Resonance Imaging (MRI) machine, a Computed Tomography (CT) scanner, or an ultrasonic machine), a navigation device, a Global Positioning System (GPS) receiver, an Event Data Recorder (EDR), a Flight Data Recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter), each of which includes a communication function. An electronic device according to an embodiment of the present invention may be a combination of one or more of the aforementioned various devices. Further, it will be apparent to those skilled in the art that an electronic device according to an embodiment of the present invention is not limited to the aforementioned devices. Hereinafter, an electronic device according to an embodiment of the present invention will be described with reference to the accompanying drawings. In the present disclosure, the term "user" may indicate a person using an electronic device or a device (e.g. an artificial intelligence electronic device) using an electronic device.

FIG. 1 is a block diagram of an electronic device 101 according to an embodiment of the present invention. The electronic device 101 can construct all or part of the electronic device 101 of FIG. 1.

Referring to FIG. 1, the electronic device 101 can include one or more Application Processors (APs) 110, a communication module 120, a Subscriber Identification Module (SIM) card 124, a memory 130, a sensor module 140, an input module 150, a display 160, an interface 170, an audio compression/decompression (codec) device 180, a camera module 191, a power management module 195, a battery 196, an indicator 197, and a motor 198.

The AP 110 controls hardware or software components connected to the AP 110 by driving an operating system or an application program, and performs data processing and operations including multimedia data. For example, the AP 110 can be implemented using a System on Chip (SoC). The AP 110 can further include a Graphics Processing Unit (GPU).

Figure 2:
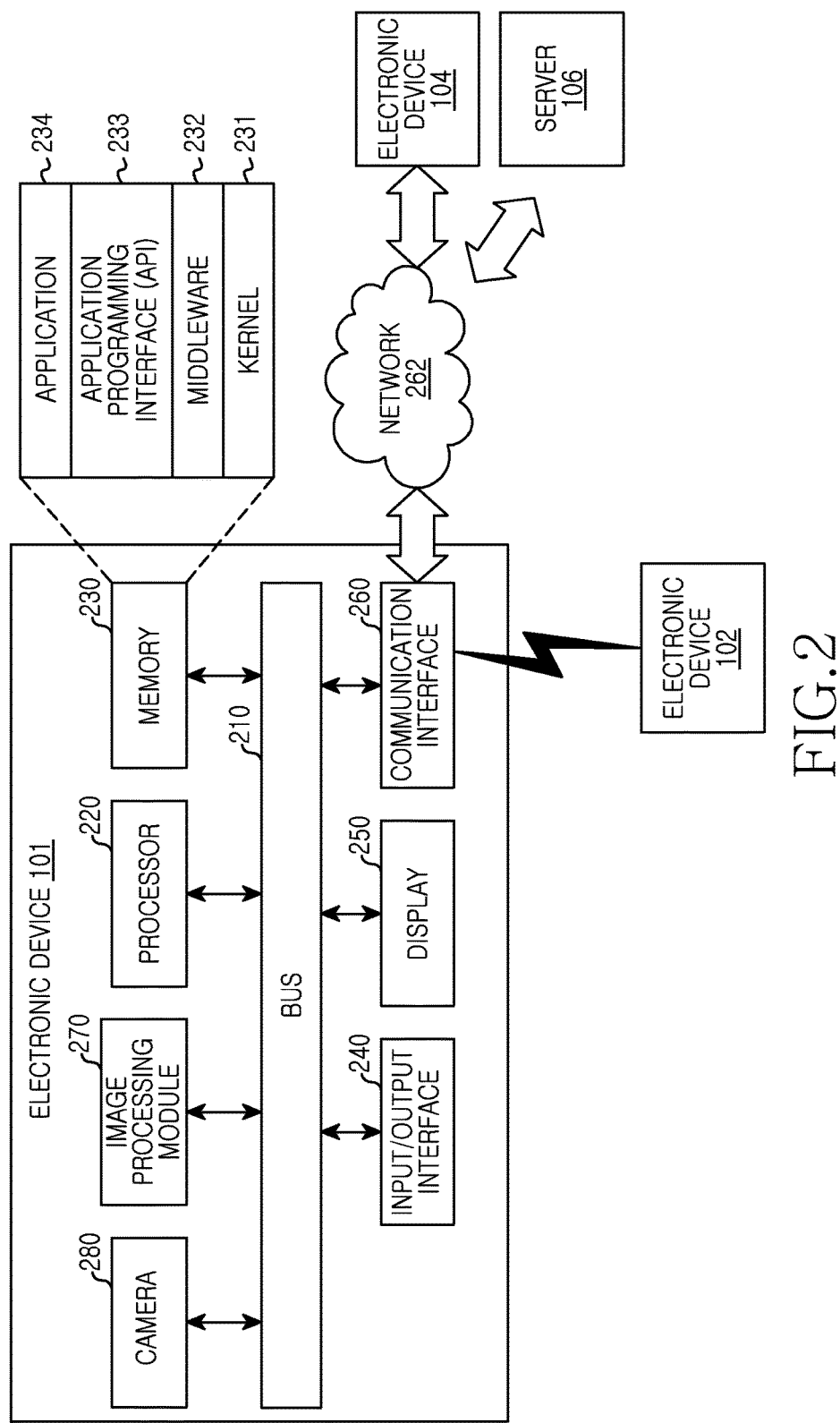
FIG. 2 is a block diagram of a network environment including an electronic device, according to an embodiment of the present invention.

The communication module 120 transmits and receives data in a communication between the electronic device 101 and other electronic devices (e.g., an electronic device 104 or a server 106 illustrated in FIG. 2) connected over the network 262 illustrated in FIG. 2. For example, the communication module 120 in FIG. 1 can include a cellular module 121, a Wireless Fidelity (WiFi) module 123, a BT module 125, a GPS module 127, a Near Field Communication (NFC) module 128, and a Radio Frequency (RF) module 129.

The cellular module 121 provides voice telephony, video telephony, text messaging, and Internet service over a communication network (e.g., Long Term Evolution (LTE), LTE Advanced (LTE-A), Code Division Multiple Access (CDMA), Wideband CDMA (WCDMA), Universal Mobile Telephone System (UMTS), Wireless Broadband (WiBro), or Global System for Mobile communications GSM). The cellular module 121 determines and authenticates an electronic device in a communication network using, for example, the SIM card 124. The cellular module 121 can perform at least part of the functions of the AP 110. The cellular module 121 can perform at least part of a multimedia control function.

The cellular module 121 can include a Communication Processor (CP). The cellular module 121 can be implemented using, for example, an SoC. Although the components of the cellular module 121 (e.g., a CP), the memory 130, and the power management module 195 are shown separate from the AP 110 in FIG. 1, the AP 110 can include part (e.g., the cellular module 121) of those components.

The AP 110 or the cellular module 121 (e.g., a CP) loads and processes an instruction or data received from its non-volatile memory or at least one of the other components, in a volatile memory. The AP 110 or the cellular module 121 stores data received from or generated by at least one of the other components, in a non-volatile memory.

The WiFi module 123, the BT module 125, the GPS module 127, and the NFC module 128 each can include a processor for processing data transmitted and received via the corresponding module. Although the cellular module 121, the WiFi module 123, the BT module 125, the GPS module 127, and the NFC module 128 are shown separate from each other in FIG. 1, at least some (e.g., two or more) of the cellular module 121, the WiFi module 123, the BT module 125, the GPS module 127, and the NFC module 128 can be included in a single Integrated Circuit (IC) or IC package. For example, at least some (e.g., a CP corresponding to the cellular module 121 and a WiFi processor corresponding to the WiFi module 123) of the processors corresponding to the cellular module 121, the WiFi module 123, the BT module 125, the GPS module 127, and the NFC module 128 can be implemented using a single SoC.

The RF module 129 transmits and receives data, for example, RF signals. The RF module 129 can include a transceiver, a Pulse Amplitude Modulation (PAM) module, a frequency filter, or a Low Noise Amplifier (LNA). The RF module 129 can further include a component, e.g., a conductor or a conductive wire, for sending and receiving electromagnetic waves in free space in a wireless communication. Although the cellular module 121, the WiFi module 123, the BT module 125, the GPS module 127, and the NFC module 128 share the single RF module 129 in FIG. 1, at least one of the cellular module 121, the WiFi module 123, the BT module 125, the GPS module 127, and the NFC module 128 can transmit and receive RF signals using a separate RF module.

The SIM card 124 can be inserted in a slot formed at a certain location of the electronic device 101. The SIM card 124 includes unique identification information (e.g., Integrated Circuit Card Identifier (ICCID)) or subscriber information (e.g., International Mobile Subscriber Identity (IMSI)).

The memory 130 can include an internal memory 132 or an external memory 134. The internal memory 132 includes at least one of, for example, a volatile memory (e.g., Dynamic Random Access Memory (DRAM), Static RAM (SRAM), Synchronous DRAM (SDRAM)) and a non-volatile memory (e.g., One Time Programmable Read Only Memory (OTPROM), PROM, Erasable PROM (EPROM), Electrically Erasable PROM (EEPROM), mask ROM, flash ROM, NAND flash memory, NOR flash memory).

The internal memory 132 may employ a Solid State Drive (SSD). The external memory 134 can further include a flash drive, for example, a Compact Flash (CF) drive, a Secure Digital (SD) card, a Mini-SD, an extreme Digital (xD) card, or a memory stick. The external memory 134 can be functionally connected to the electronic device 101 via various interfaces. The electronic device 101 can further include a storage device (or a storage medium) such as a hard drive.

The sensor module 140 measures a physical quantity or detects an operation status of the electronic device 101, and converts the measured or detected information to an electric signal. The sensor module 140 includes at least one of, for example, a gesture sensor 140A, a gyro sensor 140B, an atmospheric pressure sensor 140C, a magnetic sensor 140D, an acceleration sensor 140E, a grip sensor 140F, a proximity sensor 140G, a color sensor (e.g., a Red Green Blue (RGB) sensor) 140H, a biometric sensor 140I, a temperature/humidity sensor 140J, a light sensor 140K, and an Ultra Violet (UV) light sensor 140M, and a geomagnetic sensor 140P.

Additionally or alternatively, the sensor module 140 can include an Electronic Nose (E-nose) sensor, an ElectroMyoGram (EMG) sensor, an ElectroEncephaloGram (EEG) sensor, an ElectroCardioGram (ECG) sensor, an InfraRed (IR) sensor, an iris sensor, or a fingerprint sensor. The sensor module 140 can further include a control circuit for controlling the one or more sensors.

The input module 150 can include a touch panel 152, a (digital) pen sensor 154, a key 156, and an ultrasonic input device 158. The touch panel 152 can recognize a touch input using at least one of capacitive, resistive, infrared, and Surface Acoustic Wave (SAW) techniques. The touch panel 152 may further include a control circuit. The capacitive touch panel can recognize not only a direct touch but also a proximity of a touch. The touch panel 152 may further include a tactile layer. In this case, the touch panel 152 can provide a tactile response to a user.

The (digital) pen sensor 154 can be implemented using the same or similar method as or to a user's touch input, or a separate recognition sheet. The key 156 can include, for example, a physical button, an optical key, or a keypad. The ultrasonic input device 158, which obtains data by detecting a microwave through a microphone (e.g., a microphone 188) in the electronic device 101, allows radio frequency identification through a pen which generates an ultrasonic signal. The electronic device 101 may receive a user input from a connected external device (e.g., a network, a computer, or a server) using the communication module 120.

The display 160 can include a panel 162, a hologram device 164, and a projector 166. The panel 162 can employ a Liquid Crystal Display (LCD) or an Active Matrix Organic Light Emitting Diode (AMOLED). The panel 162 can be implemented flexibly, transparently, or wearably. The panel 162 may be constructed as a single module with the touch panel 152. The hologram device 164 can present a three-dimensional image in the air using the interference of light. The projector 166 can display an image by projecting light onto a screen. The screen can be internal or external to the electronic device 101. The display 160 can further include a control circuit for controlling the panel 162, the hologram device 164, or the projector 166.

The interface 170 can include, for example, a High Definition Multimedia Interface (HDMI) 172, a Universal Serial Bus (USB) 174, an optical terminal 176, and a D-subminiature (D-sub) connector 178. The interface 170 can be included in, for example, the communication interface module (e.g., a communication interface 260 of FIG. 2). Additionally or alternatively, the interface 170 can include, for example, a Mobile High-Definition Link (MHL), an SD/MMC interface, or IrDA interface.

The audio codec 180 can convert voice to an electrical signal and vice versa. For example, the audio codec 180 can process sound information input and output through a speaker 182, a receiver 184, an earphone 186, or the microphone 188.

The camera module 191 can capture a still picture and a moving picture. For example, the camera module 191 can include one or more image sensors (e.g., a front sensor or a rear sensor), a lens, an Image Signal Processor (ISP), or a flash (e.g., a Light Emitting Diode (LED) or a xenon lamp).

The power management module 195 can manage power of the electronic device 101. For example, the power management module 195 can include a Power Management IC (PMIC), a charger IC, a battery, or a battery gauge. For example, the PMIC can be mounted in an IC or an SoC semiconductor.

The charging type can be divided into a wired type and a wireless type. A charger IC can charge the battery 196 and prevent overvoltage or overcurrent from flowing from a charger. For example, a charger IC can include a charger IC for at least one of a wired charging type or a wireless charging type. For example, a wireless charging type includes magnetic resonance, magnetic induction, and microwave, and can further include an additional circuit such as coil loop, a resonance circuit, and a rectifier circuit for wireless charging.

The battery gauge can measure, for example, a remaining capacity of the battery 196 and a voltage, a current, or a temperature of a charging. The battery 196 can store or produce electricity and supply power to the electronic device 101 using stored or produced electricity. For example, the battery 196 can be a rechargeable battery or a solar battery.

The indicator 197 can display a certain status, for example, a booting state, a message state, or a charging state of the electronic device 101 or part (e.g., the AP 110) of the electronic device 101. The motor 198 can convert an electrical signal to a mechanic vibration. The electronic device 101 can include a processor (e.g., a GPU) for supporting mobile TV. For example, a processor for supporting mobile TV can process media data in conformity with a Digital Multimedia Broadcasting (DMB), a Digital Video Broadcasting (DVB), or a media flow standard.

The aforementioned components of the electronic device 101 can include one or more parts, and a name of a corresponding component can differ according to the type of the electronic device 101. The electronic device 101 of the present invention can include at least one of the components, omit some components, or further include other components. Some of the electronic device 101 components can be consolidated into a single unit to carry out the same functions of the corresponding components.

FIG. 2 is a block diagram of a network environment including an electronic device 101, according to an embodiment of the present invention.

An electronic device 101 may constitute, for example, the entirety or a part of the electronic device 101 illustrated in FIG. 1.

Referring to FIG. 2, the electronic device 101 includes a bus 210, a processor 220, a memory 230, an input/output interface 240, a display 250, a communication interface 260, an image processing module 270, and a camera 280.

The bus 210 is a circuit that interconnects the aforementioned elements and transfers a communication signal (e.g., a control message) between the aforementioned elements.

The processor 220 receives instructions from the aforementioned other elements (e.g., the memory 230, the input/output interface 240, the display 250, the communication interface 260, and the image processing module 270) through the bus 210 and decodes the received instructions to perform a calculation or process data according to the decoded instructions.

The memory 230 (e.g., the memory 130 of FIG. 1) stores instructions or data received from or generated by the processor 220 or the other elements (e.g., the input/output interface 240, the display 250, the communication interface 260, and the image processing module 270). The memory 230 may include programming modules, for example, a kernel 231, middleware 232, an Application Programming Interface (API) 233, and at least one application 234. The above-described programming modules may be configured with software, firmware, hardware, or a combination of two or more thereof.

The kernel 231 controls or manages system resources (e.g., the bus 210, the processor 220, and the memory 230) used to execute operations or functions implemented in the remaining programming modules, for example, the middleware 232, the API 233, and the application 234. In addition, the kernel 231 provides an interface through which the middleware 232, the API 233, or the application 234 may access the individual elements of the electronic device 101 to control or manage the same.

The middleware 232 may function as a relay that enables the API 233 or the application 234 to communicate with the kernel 231 for data transfer. In addition, in regard to task requests received from the application 234, the middleware 232 may perform a control (e.g., scheduling or load balancing) for task requests, using a method of assigning, to at least one of the application 234, a priority for using the system resources (e.g., the bus 210, the processor 220, and the memory 230) of the electronic device 101.

The API 233 is an interface through which the application 234 controls functions provided from the kernel 231 or the middle ware 232 and may include, for example, at least one interface or function (e.g., an instruction) for file control, window control, image processing, text control, or the like.

The applications 234 may include an application related to an information exchange between the electronic device 101 and an external electronic device (e.g., an electronic device 102 or 104). The application related to the information exchange may include, for example, a notification relay application for transferring certain information to the external electronic device or a device management application for managing the external electronic device. According to an embodiment of the present invention, the application 234 may include an application additionally designated according to an attribute (e.g., a type) of the external electronic device (e.g., the electronic device 102 or 104).

The input/output interface 240 transfers instructions or data, input from a user through a sensor (e.g., an acceleration sensor or a gyro sensor) or an input device (e.g., a keyboard or a touch screen), to the processor 220, the memory 230, the communication interface 260, or the image processing module 270 through the bus 210. For example, the input/output interface 240 provides data for a user's touch input through a touch screen to the processor 220. In addition, through an output device (e.g., a speaker or a display), the input/output interface 240 outputs instructions or data received through the bus 210 from the processor 220, the memory 230, the communication interface 260, or the image processing module 270. For example, the input/output interface 240 may output voice data, processed through the processor 220, to the user through a speaker.

The display 250 displays various types of information (e.g., multimedia data or text data) to a user. In addition, the display 250 may also be configured with a touch screen to which an instruction is input by a touch or a proximity touch of an input means on a display.

The communication interface 260 (e.g., the communication module 120 of FIG. 1) may establish communication between the electronic device 101 and an external device (e.g., the electronic device 104 or the server 106). For example, the communication interface 260 may communicate with the external device while being connected to the network 262 through wireless communication or wired communication. The wireless communication may include at least one of, for example, Wireless Fidelity (Wi-Fi), Bluetooth, Near Field Communication (NFC), Global Positioning System (GPS), and cellular communication (e.g., LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present invention, the network 262 may be a communication network. The communication network may include at least one of a computer network, the Internet, the Internet of Things (IoT), and a telephone network. According to an embodiment of the present invention, a protocol (e.g., a transport layer protocol, a data link layer protocol, or a physical layer protocol) for communication between the electronic device 101 and an external device may be supported by at least one of the application 234, the application programming interface 233, the middleware 232, the kernel 231, and the communication interface 260.

The image processing module 270 acquires at least one captured image through the camera 280, determines a place corresponding to the captured image by comparing the captured image with at least one designated stored image, and performs at least one function designated based on the determined place.

According to an embodiment of the present invention, the image processing module 270 may acquire a captured image through photographing at a time when detecting a particular object. According to an embodiment of the present invention, the particular object may be an object that is the same as or similar to a volume, a shape, or a color designated in the photographing region of the camera 280. The image processing module 270, when detecting a particular object in a photographing region of the camera 280, may acquire a captured image corresponding to the photographing region. The image processing module 270 may acquire a captured image by capturing two or more images at a designated time interval. The image processing module 270 may acquire a captured image by capturing two or more images based on a distance between the electronic device 101 and a designated object or a moving distance of the electronic device 101. The image processing module 270 may acquire at least one image captured in real time as a captured image. The image processing module 270 may compare at least one object detected from the captured image with stored images. The image processing module 270 may compare at least one of an object shape, object feature points, an object color, and a form in which at least one object is disposed with the stored images. The image processing module 270 may determine a place based on a moving path of the electronic device 101 determined based on a change in distance between designated objects detected from the two or more captured images and the electronic device 101. The image processing module 270 controls at least one function designated in response to the determined place among functions corresponding to Wi-Fi, Bluetooth, a GPS, a program, and an input instruction. The image processing module 270 may be connected to another designated electronic device 101 through a designated network communication. The image processing module 270 receives input of a designated instruction and transmits, to another electronic device, data for requesting the other electronic device to execute the input instruction.

As described above, the electronic device 101 performs an embodiment of the present invention through the image processing module 270. However, an embodiment of the present invention performed by the image processing module 270 may be operations performed under the control of the processor 220. In addition, without separately including the image processing module 270, the electronic device 101 may also perform, through the processor 220, an embodiment of the present invention illustrated as being performed by the image processing module 270. Furthermore, the image processing module 270 may also be configured as a part of the processor 220. The operations of the image processing module 270 which are described below with reference to FIG. 3 may also be applied in the same way. Additional information on the image processing module 270 may be provided through FIGS. 3 to 11B which are described below.

The camera 280 may be functionally connected to the electronic device 101 or mounted at a designated location of the electronic device 101 to capture an image corresponding to a designated view angle.

Figure 3:
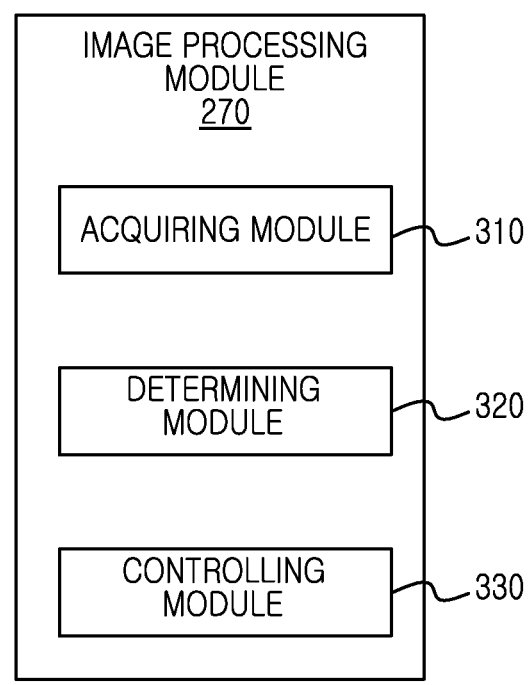
FIG. 3 is a block diagram of an image processing module of an electronic device, according to an embodiment of the present invention.

FIG. 3 is a block diagram of an image processing module of an electronic device 101, according to an embodiment of the present invention.

Referring to FIG. 3, the image processing module 270 includes an acquiring module 310, a determining module 320, and a controlling module 330.

According to an embodiment of the present invention, the acquiring module 310 acquires at least one image (e.g., a captured image) through the camera 280 included or functionally connected to the electronic device 101. In the acquisition of a captured image, the acquiring module 310 acquires a captured image at a time when detecting that a designated instruction (e.g., an instruction for photography) is input to the electronic device 101, and acquires two or more images (e.g., a video or preview images) through photography for a designated number of times at designated time intervals from a designated time. The acquiring module 310 acquires a captured image by capturing two or more images based on a distance between the electronic device 101 and a designated object or a moving distance of the electronic device 101. The acquiring module 310 may acquire at least one image while the camera 280 is capturing images (e.g., a moving image) in real time. According to an embodiment of the present invention, in cases where the acquiring module 310 detects a designated instruction (e.g., an instruction to determine a place) while the camera 280 is capturing images in real time, the acquiring module 310 may acquire a designated number of images among the captured images or may acquire a designated number of images from the camera 280 which is capturing images in real time. In cases where the acquiring module 310 detects at least one feature point designated by setting information in the photographing region of the camera 280, the acquiring module 310 may also acquire a captured image corresponding to a photographing region. In this case, the feature point may be various features of an object such as a composition of a photographing region of the camera 280, a form (e.g. a shape) and/or an outline of an object included in a photographing region, a color of an object, a composition (e.g. a pattern) in which two or more objects are arranged, and a distance between the electronic device 101 and a designated object. According to an embodiment of the present invention, based on a captured image acquired through the camera 280, the determining module 320 determines the place where the electronic device 101 is located. The determining module 320 compares a captured image with at least one image designated by setting information of the electronic device 101 to determine a matched image and determine a place designated by a matched image as a place where the electronic device 101 is located. The determining module 320 detects at least one object included in a captured image. In a comparison of a captured image and an image designated by setting information of the electronic device 101, the determining module 320 determines the same or similar image by determining and comparing various feature points of an object, such as a composition of an image, a form (e.g. a shape) and/or outline of an object included in a image, a color of an object, a composition (e.g. a pattern) in which two or more objects are arranged, and a distance between the electronic device 101 and a designated object. The electronic device 101 may include, in the memory 230 (e.g., the database of the memory 230), an image descriptor including various feature points for at least one object included in the captured image and/or at least one image included in the memory 230. In the determination of a place where the electronic device 101 is located based on the captured image, the determining module 320 determines the place in conjunction with at least one positioning sensor (e.g., a GPS, Wi-Fi, or Bluetooth) included in the electronic device 101.

In the determination of an image that is the same as or similar to a captured image or at least one object included therein, the determining module 320 compares the captured image with at least one image stored in the electronic device 101 or an image acquired from at least one other electronic device (e.g., the server 106) connected to the electronic device 101. The determining module 320 may designate and store an image corresponding to a certain location in a preset menu, and when it is determined that a captured image acquired by the electronic device 101 or an object included in the captured image is the same as or similar to a preset image, the determining module 320 determines a location of the electronic device 101 as a location corresponding to the preset image. According to an embodiment of the present invention, based on setting information, the determining module 320 determines a function of the electronic device 101 that is designated to be performed in response to a determined place obtained by a comparison of a captured image. The setting information may include information that is configured to perform at least one function of the electronic device 101 in response to a determined place, and the determining module 320 determines at least one function, which will be performed in the electronic device 101 in response to a determined place, based on the setting information. The determining module 320 receives an instruction input externally and determines to execute the input instruction in response to a determined place.

In the execution of a designated function of the electronic device 101, the determining module 320 performs a preset function in response to a location of the electronic device 101 determined based on a captured image. For example, the electronic device 101 may determine that an image is the same as or similar to a captured image or an object included therein. The determining module 320 may determine to notify of a location of the electronic device 101, which is configured in response to a same or similar image, to a user through a device such as the display 250 or a speaker. In addition, based on setting information, the determining module 320 may perform a function of the electronic device 101 which is configured in response to a same or similar image. Here, the configured function of the electronic device 101 may be a function directly performed by the electronic device 101 or a function of allowing the electronic device 101 to control at least one other electronic device (e.g., another electronic device connected thereto through communication).

According to an embodiment of the present invention, in response to a determined place, the controlling module 330 performs at least one function stored in setting information. According to an embodiment of the present invention, the controlling module 330 may make a control such that the electronic device 101 and another designated electronic device (e.g., the electronic device 102) are connected to each other through a designated network communication. The controlling module 330 may control at least one device included in or functionally connected to the electronic device 101 to be turned on/off. The controlling module 330 may control at least one program included in the electronic device 101. The controlling module 330 may perform a function of controlling at least one other electronic device (e.g., another electronic device connected thereto through communication) through the electronic device 101. Based on the determined place, the controlling module 330 may execute an instruction input to the electronic device 101.

According to the above description, an electronic device 101 that performs an embodiment of the present invention may include a camera that captures an image, a memory that stores a captured image, and at least one processor that acquires at least one captured image, determines a place corresponding to a captured image by comparing a captured image with at least one designated stored image, and performs at least one function in response to a determined place. The processor 220 may acquire a captured image by capturing at a time when detecting a certain object. The processor 220 may acquire a captured image by capturing two or more images at a designated time interval. The processor 220 may acquire the captured image by capturing two or more images based on a distance between a designated object and the electronic device 101, or a moving distance of the electronic device 101. The processor 220 may acquire at least one image captured in real time as a captured image. The processor 220 may compare at least one object detected from a captured image with a stored image. The processor 220 may compare at least one of a shape of an object, a feature point of an object, a form in which the at least one object is disposed, and a color of an object with a stored image. The processor 220 may determine a place based on a moving path of the electronic device 101 which is determined based on a change in a distance between the electronic device 101 and designated objects detected from two or more captured images. The processor 220 may control at least one function corresponding to Wi-Fi, Bluetooth, a GPS, a program, and an input instruction. The processor 220 may connect the electronic device 101 to another designated electronic device through a designated network communication. The processor 220 may input a designated instruction and transmit, to another electronic device, data for requesting the other electronic device to execute an input instruction.

Figure 4:
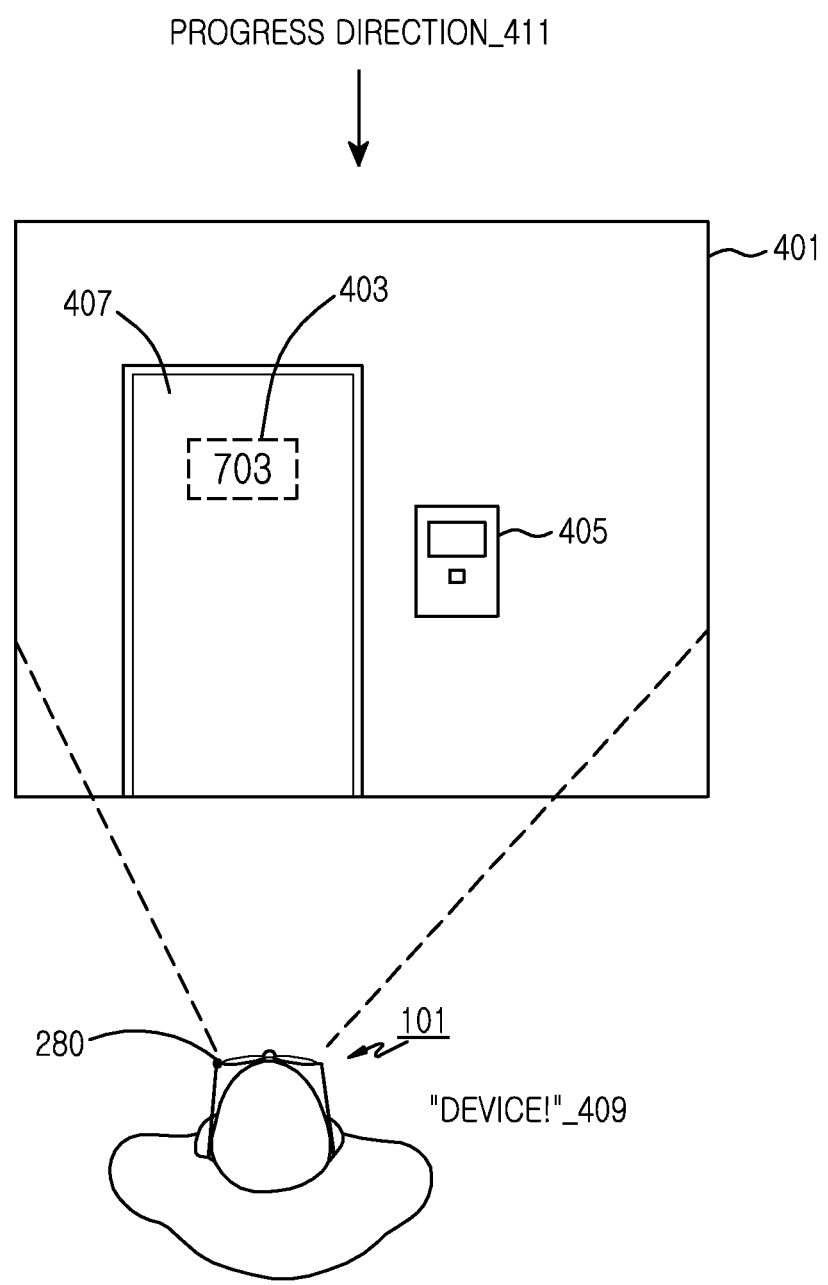
FIG. 4 is a diagram illustrating an operation of determining a designated place and performing a designated function based on a captured image in an electronic device, according to an embodiment of the present invention.

FIG. 4 is a diagram illustrating an operation of determining a designated place and performing a designated function based on a captured image in an electronic device 101, according to an embodiment of the present invention.

In cases where the electronic device 101 is a wearable electronic device (e.g., a watch-type electronic device or a glasses-type electronic device), the electronic device 101 may be worn on a user's designated body part and may photograph, through the camera 280, a designated region of an ambient environment thereof (e.g., a region corresponding to a view angle of the camera 280). According to an embodiment of the present invention, when a user is in front of a door of his/her house while wearing the electronic device 101 (e.g., the glasses-type electronic device 101), the electronic device 101 may acquire an image including various objects corresponding to a designated region around the door. In the acquisition of the image through the camera 280, in cases where the electronic device 101 detects a designated input (e.g., an instruction for photography (e.g., DEVICE!) 409) or a particular object, the electronic device 101 may acquire an image at a time when the input is detected, or may acquire an image (or video) in real time through the camera 280. The electronic device 101 may determine at least one object matching an object designated by setting information of the electronic device 101, among various objects included in the acquired image. The electronic device 101 may determine a place where the electronic device 101 is located based on setting information corresponding to a designated object, and may perform a designated function thereof, stored in the setting information, in response to the determined place.

According to an embodiment of the present invention, in a comparison of at least one object included in an image acquired through the camera 280 and an object designated by setting information of the electronic device 101, the electronic device 101 may determine the above-described object as at least a part of elements included in the image, such as a thing or a person, a form in which two or more things are arranged, a configuration pattern of things or an environment included in a view angle of the camera 280, or a color of a thing. According to an embodiment, of the present invention, the electronic device 101 may detect at least one object of a door 407, a number 403 (e.g., a room number "703") displayed at a designated location of the door, and a doorbell 405, which are included in an image 401 (or a view angle of the image) acquired through the camera 280, and may compare the detected object with images designated by the setting information of the electronic device 101. The electronic device 101 may determine a matched image based on a detected object and a form in which the object is disposed, among images designated by the setting information, and may determine a designated place in response to the determined image. In the comparison of images stored in setting information to a detected object of an image, acquired through the camera of the electronic device 101, and a form in which the object is disposed, the electronic device 101 may also further include a condition of comparing a color of the detected object with colors of objects included in the images designated by the setting information of the electronic device 101.

According to an embodiment of the present invention, in cases where the electronic device 101 determines a place where the electronic device 101 is located based on an image acquired through the camera 280, the electronic device 101 may refer to setting information to perform a designated function thereof in response to a determined place. According to an embodiment of the present invention, the electronic device 101 may determine a location thereof, determined based on an image acquired through the camera 280 and designated images of setting information, as "my house." The electronic device 101 may identify that information stored in a "my house" category of the setting information is configured to change a mode of the electronic device 101 to a first mode (e.g., a general mode). According to an embodiment of the present invention, the general mode may be a mode for setting a ringtone of the electronic device 101 to a maximum level, setting a GPS to be in an on state, setting Wi-Fi to be in an on state, and setting Bluetooth to be in an on state. In cases where the electronic device 101 determines a place where the electronic device 101 is located as "my house" based on the image 401 captured through the camera 280, the electronic device 101 may set a ringtone thereof to a maximum level, the GPS to be in the on state, the Wi-Fi to be in the on state, and the Bluetooth to be in the on state, according to a setting of a first mode designated to "my house" of the setting information.

According to an embodiment of the present invention, the electronic device 101 may determine a place where the electronic device 101 is located based on an image acquired through the camera 280. In the determination of a place where the electronic device 101 is located, the electronic device 101 may determine a place in conjunction with location information acquired through at least one sensor included in or functionally connected to the electronic device 101. In response to a determined place where the electronic device 101 is located, the electronic device 101 may perform a function (and/or a user's input instruction) designated to setting information. According to an embodiment of the present invention, based on location information acquired through a GPS, the electronic device 101 may determine a place where the electronic device 101 is located as "my house." Based on at least one object included in an image acquired through the camera 280, the electronic device 101 may determine whether the electronic device 101 arrives at a location corresponding to "my house" or departs from a location. For example, referring to the image 401 acquired through the camera 280, the electronic device 101 may determine that the electronic device 101 has arrived at a location corresponding to "my house," according to designated images of setting information matching at least some objects (e.g., a room "703" 403 and a doorbell 405) included in the image 401. According to an embodiment of the present invention, based on location information acquired through a GPS, the electronic device 101 may determine that the electronic device 101 is situated at a location corresponding to "my house." The electronic device 101 may acquire an image through the camera 280 while being moved in a direction by a user wearing the electronic device 101. The electronic device 101 may acquire an image of an opposite side of the door 407, like the image 401 illustrated in FIG. 4, to correspond to the direction 411 of the electronic device 101. In response to the image designated by the setting information of the electronic device 101 which matches at least a portion of an acquired image of the opposite side of the door 407, the electronic device 101 may determine that the electronic device 101 has departed (e.g. has left) from a location corresponding to "my house" (e.g. going out). The electronic device 101 may perform a function designated by the setting information (or a designated function of the electronic device 101) corresponding to "my house" and "going out" which are determined based on the acquired image. According to an embodiment of the present invention, the electronic device 101 may include, in setting information corresponding to "my house," information for making a control such that the electronic device 101 is connected to a designated electronic device (e.g., the electronic device 102) when wireless communication, such as Wi-Fi or Bluetooth, is in an on state. According to an embodiment of the present invention, the electronic device 101 may include, in setting information corresponding to "going out," information for controlling the electronic device 101 to turn off another electronic device connected thereto through wireless communication. In cases where the state of the electronic device 101, determined based on information acquired through GPS and an image acquired through the camera 280, corresponds to "my house" and "going out," the electronic device 101 may transmit, to the electronic device 102, an instruction to turn off the electronic device 102 connected thereto.

Figure 5A:
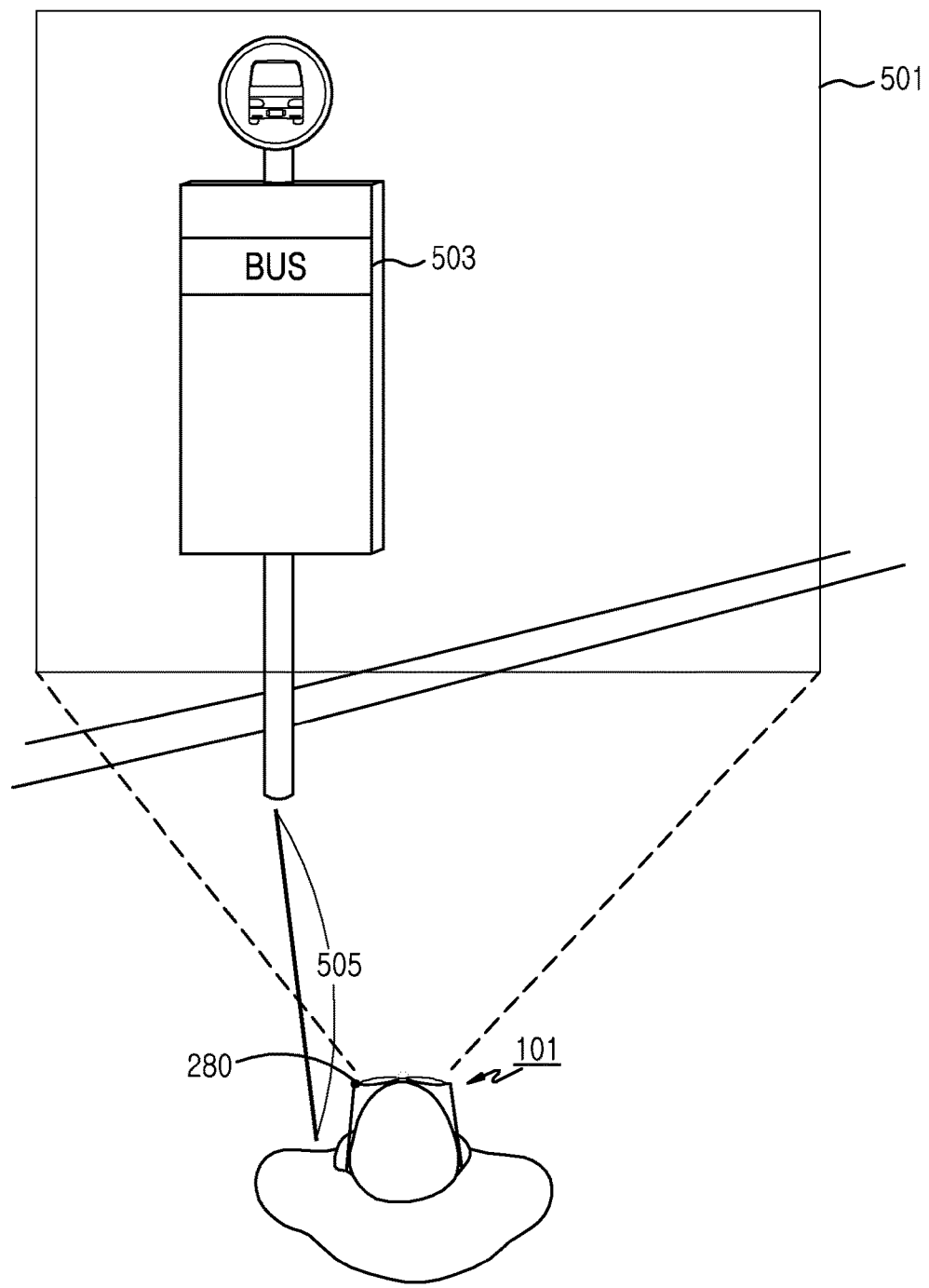
FIGS. 5A and 5B are diagrams illustrating operations of determining a location of an electronic device through an image in the electronic device, according to an embodiment of the present invention.
Figure 5B:
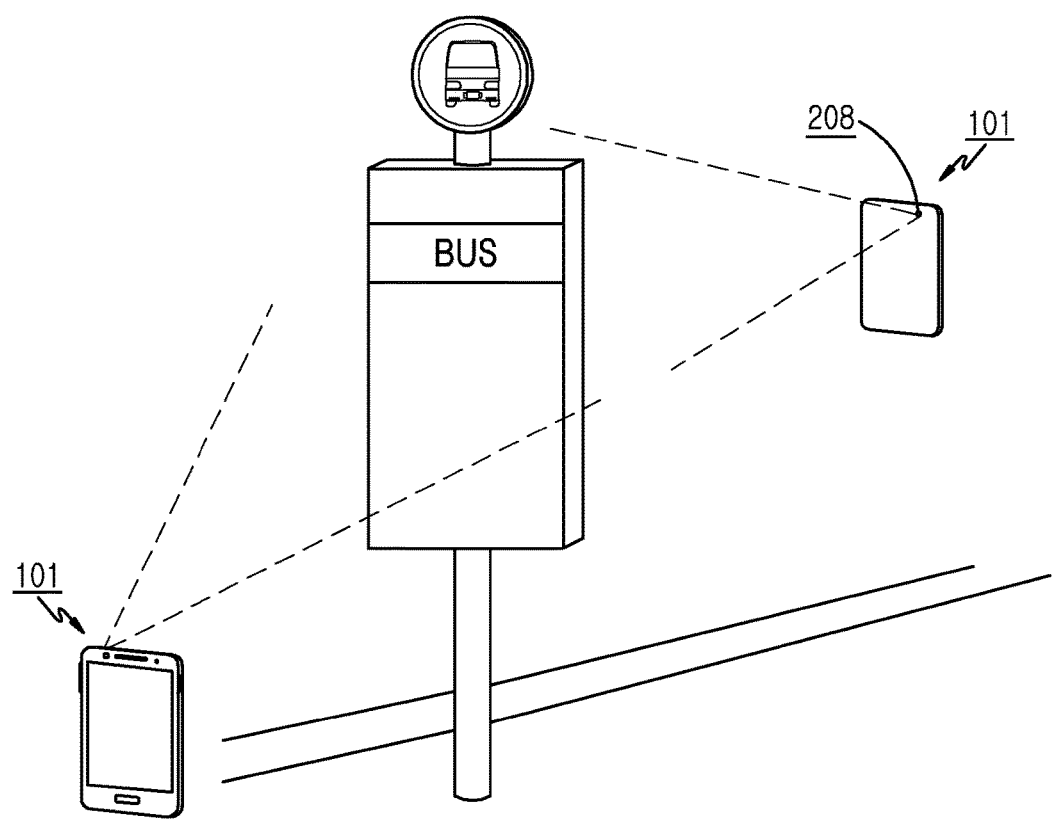

FIGS. 5A and 5B are diagrams illustrating operations of determining a location of an electronic device 101 through an image in the electronic device 101, according to an embodiment of the present invention.

Hereinafter, various embodiments of the present invention will be described with reference to FIG. 5A.

According to an embodiment of the present invention, the electronic device 101 may determine a place where the electronic device 101 is located based on at least one image acquired through the camera 280. In the acquisition of an image, the electronic device 101 may acquire at least one image from a time when detecting a designated input or a particular object. According to an embodiment of the present invention, the electronic device 101, after acquiring a first image, may acquire an image 501 through photography for a designated number of times (e.g., three times) at every designated time interval (e.g., 1 second). According to an embodiment of the present invention, the electronic device 101 may acquire a captured image by capturing two or more images based on a distance between the electronic device 101 and a designated object or a moving distance of the electronic device 101. For example, the electronic device 101 may acquire two or more captured images by capturing one image and then capturing another image at a time when a distance between the electronic device 101 and a designated object is changed as much as a designated distance. In addition, the electronic device 101 may also capture an image when it is identified through a device, such as a GPS, which can determine a location of the electronic device 101 that the location of the electronic device 101 is changed as much as a distance designated by setting information. In the acquisition of the two or more images, the electronic device 101 may capture the first image according to a user selection or when an object having a feature point designated by the setting information is detected in the photographing region of the camera 280. According to an embodiment of the present invention, the electronic device 101 may capture a series of images (e.g., a video). The electronic device 101 may acquire two or more images in a form (or a type) of a still cut from a captured video image. According to an embodiment of the present invention, the electronic device 101 may detect a change of an image (or a change of an object included in an image) and when detecting a designated degree of change, may acquire multiple images through photographing. Furthermore, in the acquisition of an image, the electronic device 101 may acquire a relevant image from another electronic device (e.g., the server 106) based on a captured image, without being limited to a method of acquiring an image through photographing. In a determination of a relevant image, the electronic device 101 may determine a relevant image based on a composition of an image or an object included in an image.

Based on an acquired image, the electronic device 101 may detect at least one object (e.g., a bulletin board 503 at a bus stop) included in an image. The electronic device 101 may determine a distance 505 between the electronic device 101 and the bulletin board 503 at the bus stop which is detected from the acquired two or more images. Based on the determined distance, the electronic device 101 may determine that the electronic device 101 approaches the bus stop. When it is determined that the electronic device 101 approaches the bus stop, the electronic device 101 may determine a place, where the electronic device 101 is located, as the bus stop. The electronic device 101 may perform a function designated in response to setting information of the bus stop. According to an embodiment, the electronic device 101 may output bus route information corresponding to the bus stop which is designated based on the setting information. For example, the electronic device 101 may receive at least one piece of bus route information corresponding to the bus stop determined through the image from another electronic device (e.g., a server device providing bus route information) connected to the electronic device 101 through a network communication and may output the received bus route information. In addition, in cases where information on a designated bus (e.g., a bus number or a bus route) is configured in the setting information corresponding to the bus stop at which the electronic device 101 is located, the electronic device 101 may output the route information of the corresponding bus.

Hereinafter, various embodiments of the present invention will be described with reference to FIG. 5B.

According to an of the present invention, the electronic device 101 may determine a matched object by comparing an object included in an image acquired through the camera 280 with at least one image included in setting information of the electronic device 101. In capturing an image corresponding to an object designated by setting information, the electronic device 101 may use images obtained by photographing one object in two or more directions. According to an embodiment of the present invention, the electronic device 101 may configure an image corresponding to a designated bulletin board at a bus stop as an object used to determine a place, and may store the designated object (e.g., the bulletin board at the bus stop) as a three dimensional (3D) rendered image based on images captured at two or more view angles as illustrated in FIG. 5B. In a determination of a place based on an image obtained by photographing the bulletin board at the bus stop, the electronic device 101 may determine the place where the electronic device 101 is located as the bus stop by matching the bulletin board of the bus stop corresponding to the view angle of the captured image with a bulletin board of a bus stop in setting information configured as images captured at various angles.

Figure 6A:
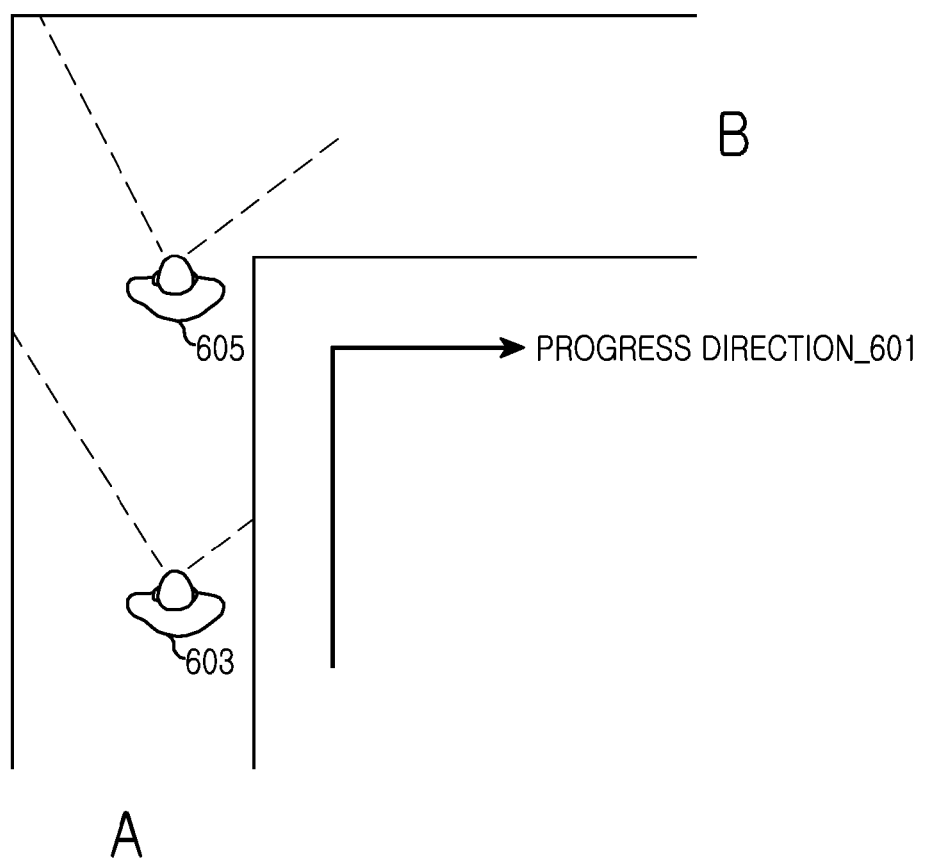
FIGS. 6A and 6B are diagrams illustrating operations of determining a place where an electronic device is located based on a moving direction of the electronic device, according to an embodiment of the present invention.
Figure 6B:
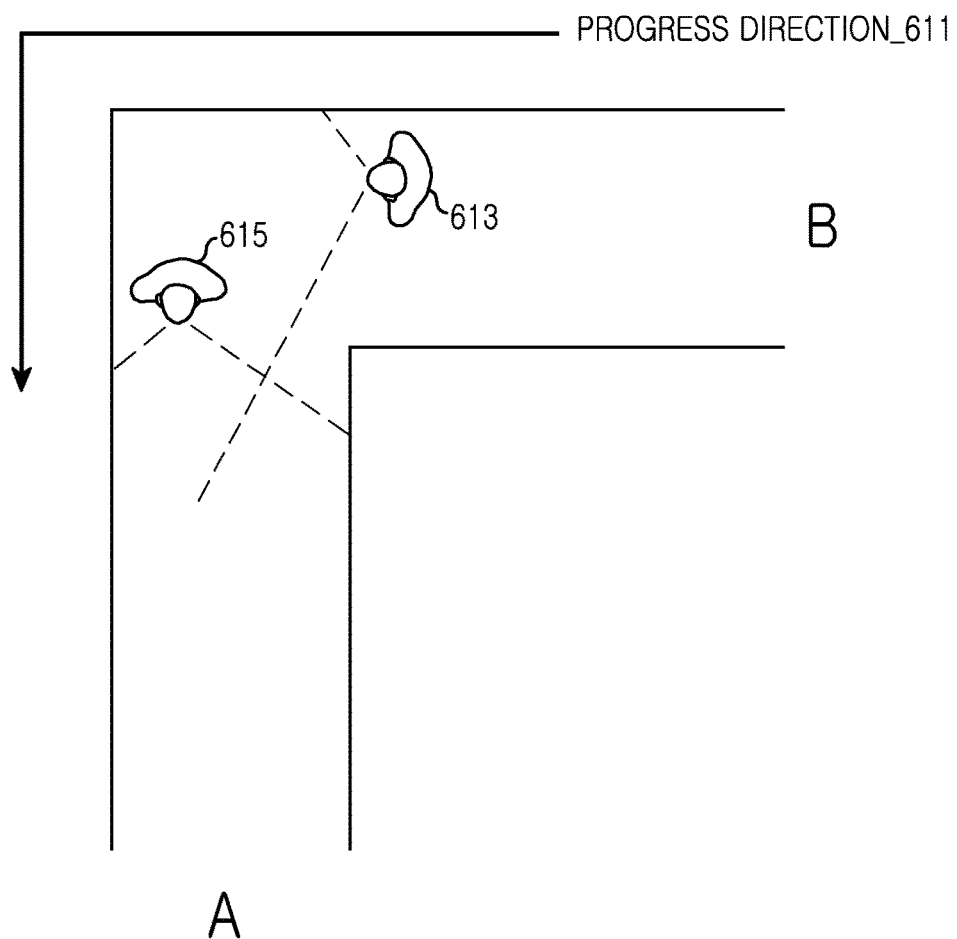

FIGS. 6A and 6B are diagrams illustrating operations of determining a provided service depending upon a moving direction of an electronic device, 101 according to an embodiment of the present invention.

According to an embodiment of the present invention, the electronic device 101 may be worn on a user's designated body part to acquire two or more images in a moving path between place A and place B. The electronic device 101 may determine a direction in which the electronic device 101 moves in a designated region based on at least one object included in an image (or a view angle of an image) captured through the camera 280, and may determine a location of a destination that is configured in response to a place where the electronic device 101 is located and/or a direction in which the electronic device 101 moves. According to an embodiment of the present invention, the electronic device 101 may determine a destination thereof, which is configured based on a location of the electronic device 101 and/or a direction in which the electronic device 101 moves, based on two or more images captured while the electronic device 101 moves in a path through which place A and place B are connected to each other, and may perform a function thereof configured in response to a destination based on setting information.

Hereinafter, various embodiments of the present invention will be described with reference to FIG. 6A.

According to an embodiment of the present invention, the electronic device 101 may acquire a first image at a first location 603 and a second image at a second location 605. The electronic device 101 may determine the first image and at least one first object included in the first image that matches at least one image designated by setting information of the electronic device 101. The electronic device 101 may determine the second image and at least one second object included in the second image that matches at least one image designated by the setting information of the electronic device 101. In this case, the first and second objects may be the same object included in the first and second images captured at the first and second locations 603 and 605. Based on the determined first and second objects, the electronic device 101 may determine a direction 601 in which the electronic device 101 moves, and may determine a place where the electronic device 101 is located as place B. In addition, the electronic device 101 may determine that the electronic device 101 has reached place B (or determine a destination thereof as place B). In determining a moving path of the electronic device 101 based on the first and second objects, the electronic device 101 may determine the moving path based on at least one of a sequence of the first and second objects designated by the setting information of the electronic device 101, a distance between the electronic device 101 and the first object, a distance between the electronic device 101 and the second object, a composition of the first object in the first image, and a composition of the second object in the second image. In response to a place where the electronic device 101 is located, the electronic device 101 may perform at least one function thereof designated by the setting information. According to an embodiment of the present invention, when the electronic device 101 determines a destination as place B based on at least one image (or when it is determined that the electronic device 101 has reached place B), the electronic device 101 may output a menu capable of controlling an illumination or a temperature of place B. Alternatively, when the electronic device 101 determines a destination as place B based on at least one image (or when it is determined that the electronic device 101 has reached place B), the electronic device 101 may output a menu capable of automatically controlling an illumination or a temperature of place B according to setting information.

Hereinafter, various embodiments of the present invention will be described with reference to FIG. 6B.

According to an embodiment of the present invention, the electronic device 101 may determine a direction 611 of the electronic device 101 based on at least two images acquired through the camera 280. The electronic device 101 may acquire a first image at a first location 613 and a second image at a second location 615 while moving. The electronic device 101 may determine a moving path thereof based on the first and second images or based on at least one object included in the first image and at least one object included in the second image. The electronic device 101 may determine a location thereof (e.g., the moving path between place A and place B) based on the two or more images acquired through the camera 280. The electronic device 101 may determine a moving path thereof (e.g., the direction 611) and may determine a destination thereof or a place where the electronic device 101 is located as place A based on the acquired two or more images, a composition of the images, and objects included in the images. The electronic device 101 may perform at least one function designated by the setting information thereof based on the determined place A. According to an embodiment of the present invention, when determining a destination as place A (e.g., a door), the electronic device 101 may output a menu capable of controlling a locking function of the door based on setting information. According to an embodiment of the present invention, in cases where the electronic device 101 determines movement from place B to place A based on at least one image, the electronic device 101 may unlock the door at place A.

As described above with reference to FIGS. 6A and 6B, the electronic device 101 may refer to images acquired at a same place depending upon a direction thereof to determine a direction or a destination thereof and provide different functions based on the determined information (e.g., the direction or destination).

Figure 7:
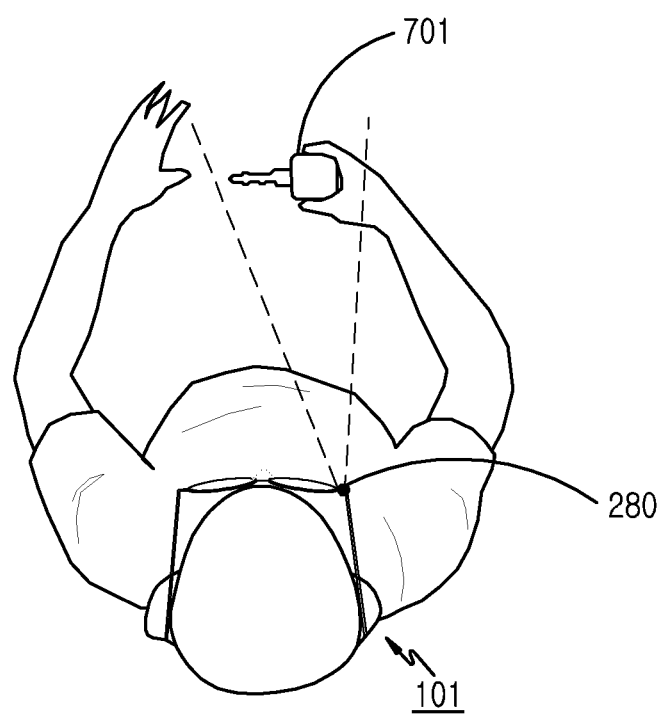
FIG. 7 is a diagram illustrating an operation of determining a place where an electronic device is located based on a captured image in the electronic device, according to an embodiment of the present invention.

FIG. 7 is a diagram illustrating an operation of determining a place where the electronic device 101 is located based on a captured image in the electronic device 101, according to an embodiment of the present invention.

According to an embodiment of the present invention, in determination of a place where the electronic device 101 is located based on an image obtained by photographing an object that indicates a designated place, the electronic device 101 may photograph a designated object (e.g., a car key) with the camera 280 thereof and determine at least one image designated by setting information thereof that matches the car key included in the image acquired by the photograph. The electronic device 101 may determine a place where the electronic device 101 is located as "my car" in response to the image matching the car key of the acquired image. The electronic device 101 may perform at least one function thereof designated based on setting information of "my car." According to an embodiment of the present invention, the setting information of "my car" may be configured to connect the electronic device 101 to another electronic device (e.g., a navigation system or the electronic device 102) through at least one network communication. The electronic device 101 may be connected to a navigation system based on setting information of "my car." The electronic device 101 may output that the electronic device 101 has been connected to a navigation system based on setting information corresponding to "my car" where the electronic device 101 is placed, and may detect an instruction input externally. According to an embodiment of the present invention, the electronic device 101 may detect an instruction to input a destination of a navigation through a microphone (e.g., the microphone 188 of FIG. 1) and configure the destination based on information input to the navigation system connected thereto.

Figure 8:
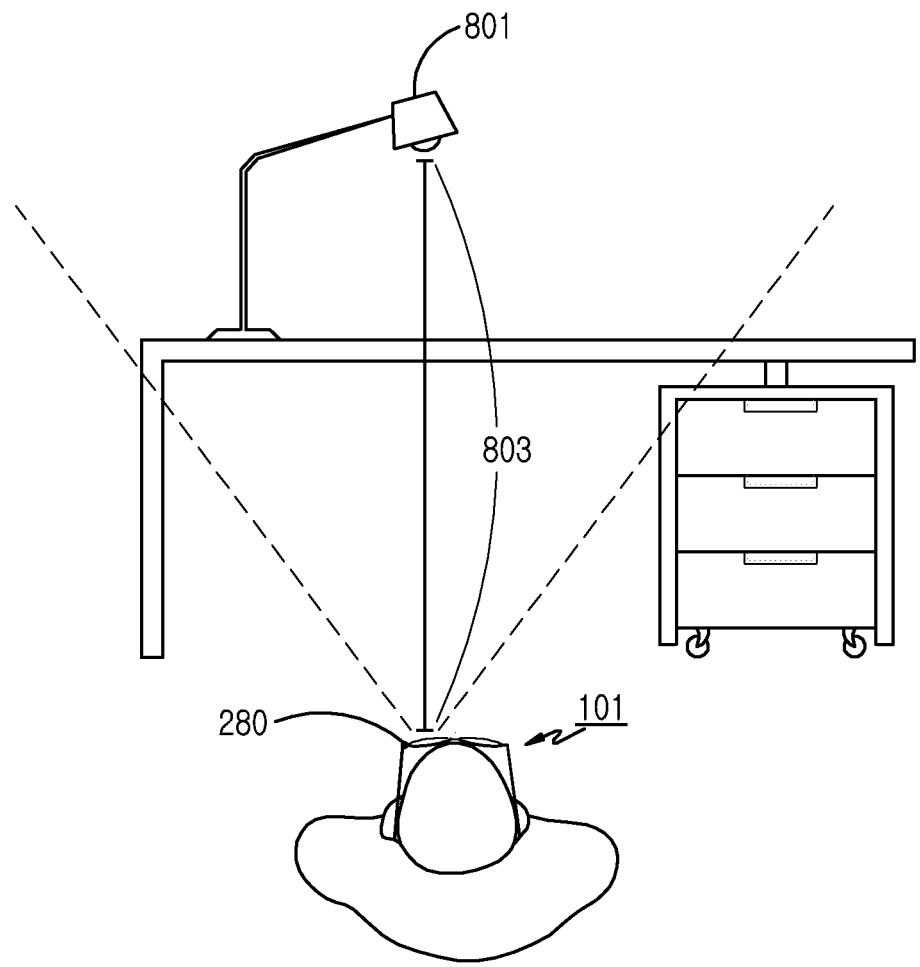
FIG. 8 is a diagram illustrating an operation of performing a function in response to a place determined based on a captured image in an electronic device, according to an embodiment of the present invention.

FIG. 8 is a diagram illustrating an operation of performing a function in response to a place determined based on a captured image in an electronic device 101, according to an embodiment of the present invention.

According to an embodiment of the present invention, the electronic device 101 may determine a place where the electronic device 101 is located based on at least one image acquired through the camera 280. According to an embodiment of the present invention, the electronic device 101 may detect a desk lamp 801 included in an image acquired through the camera 280 and determine at least one image matching the desk lamp among images designated by setting information of the electronic device 101. In a determination of at least one image designated by the setting information, the electronic device 101 may determine at least one image corresponding not only to the desk lamp 801 detected from the image captured by the camera 280 thereof but also to objects around the desk lamp 801 and a structure in which the desk lamp 801 and the objects are arranged. Based on the matched image, the electronic device 101 may determine a place where the electronic device 101 is located as "my room." When determining a place where the electronic device 101 is located as "my room," the electronic device 101 may determine a distance 803 between the electronic device 101 and the desk lamp 801 detected from the image acquired by photographing. According to an embodiment of the present invention, in cases where a place where the electronic device 101 is located is determined to be "my room," the setting information of the electronic device 101 may be configured to turn on the desk lamp 801 when the identified distance 803 between the electronic device 101 and the desk lamp 801 which is an object included in the image captured by the camera 280 of the electronic device 101 is less than a designated distance (e.g., 1 meter). When it is determined that the distance between the electronic device 101 and the desk lamp 801 is less than 1 meter, the electronic device 101 may make a control to transmit, to the desk lamp 801, an instruction to turn on the desk lamp 801.

Figure 9:
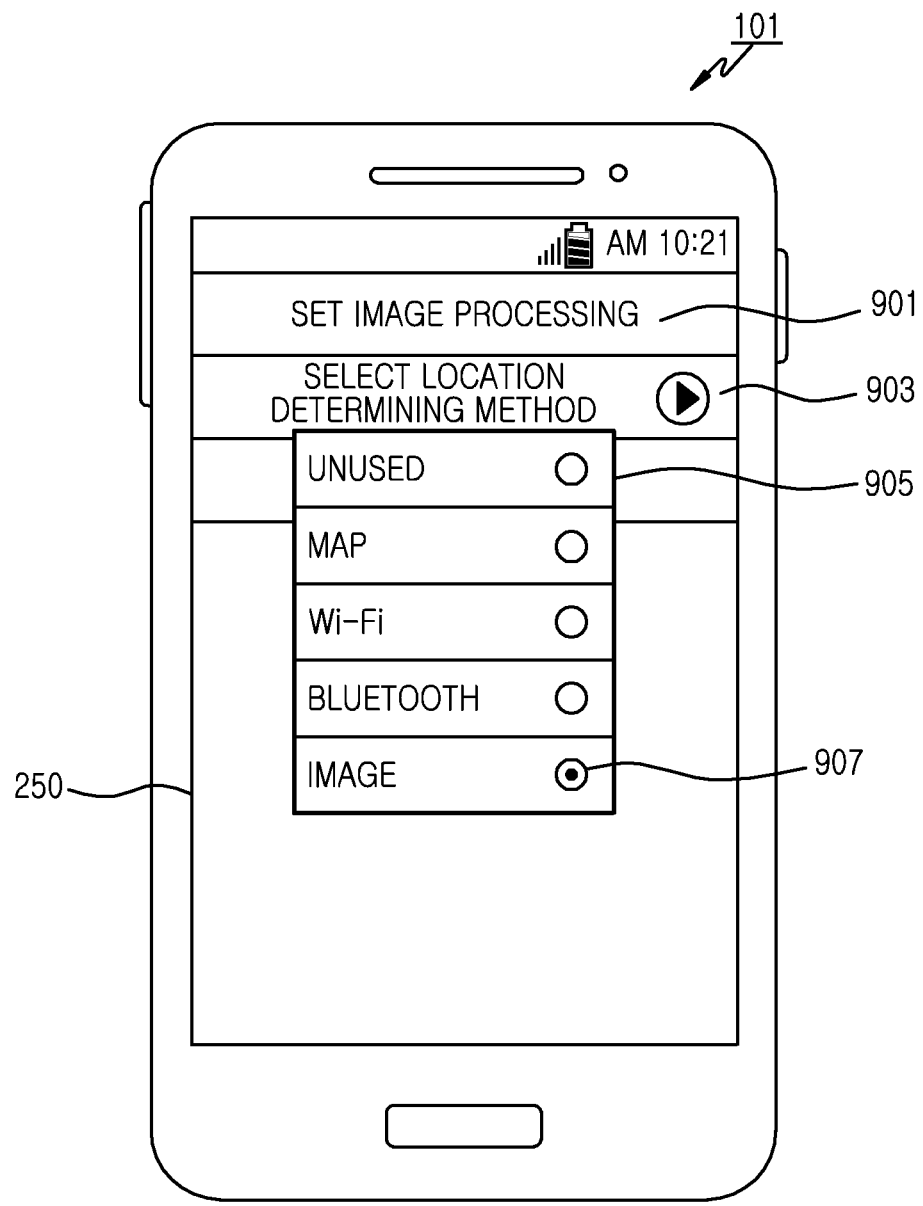
FIG. 9 illustrates determining a means for determining a location of an electronic device by setting information of the electronic device, according to an embodiment of the present invention.

FIG. 9 illustrates determining a means for determining a location of an electronic device 101 in setting information of the electronic device 101, according to an embodiment of the present invention.

According to an embodiment of the present invention, in determining a place where an electronic device 101 is located, the electronic device 101 may determine the place depending upon setting information thereof. According to an embodiment of the present invention, in determining a place where the electronic device 101 is located, the electronic device 101 may determine the place based on at least one of location information of the electronic device 101 acquired through GPS included therein (e.g., location information displayed on a map), location information determined based on information that the electronic device 101 receives from at least one other device connected thereto through Wi-Fi or Bluetooth, and location information determined based on an image acquired through the camera 280 of the electronic device 101 and/or at least one designated object included in the image. According to an embodiment of the present invention, the electronic device 101 may provide, through a display 250, setting information 901 for selecting a means for determining a place where the electronic device 101 is located. The electronic device 101 may provide, to the setting information 901, various means as a method 903 of determining a place where the electronic device 101 is located, and when an image option 907 is selected, may determine a place where the electronic device 101 is located based on an image acquired through the camera 280.

Figure 10:
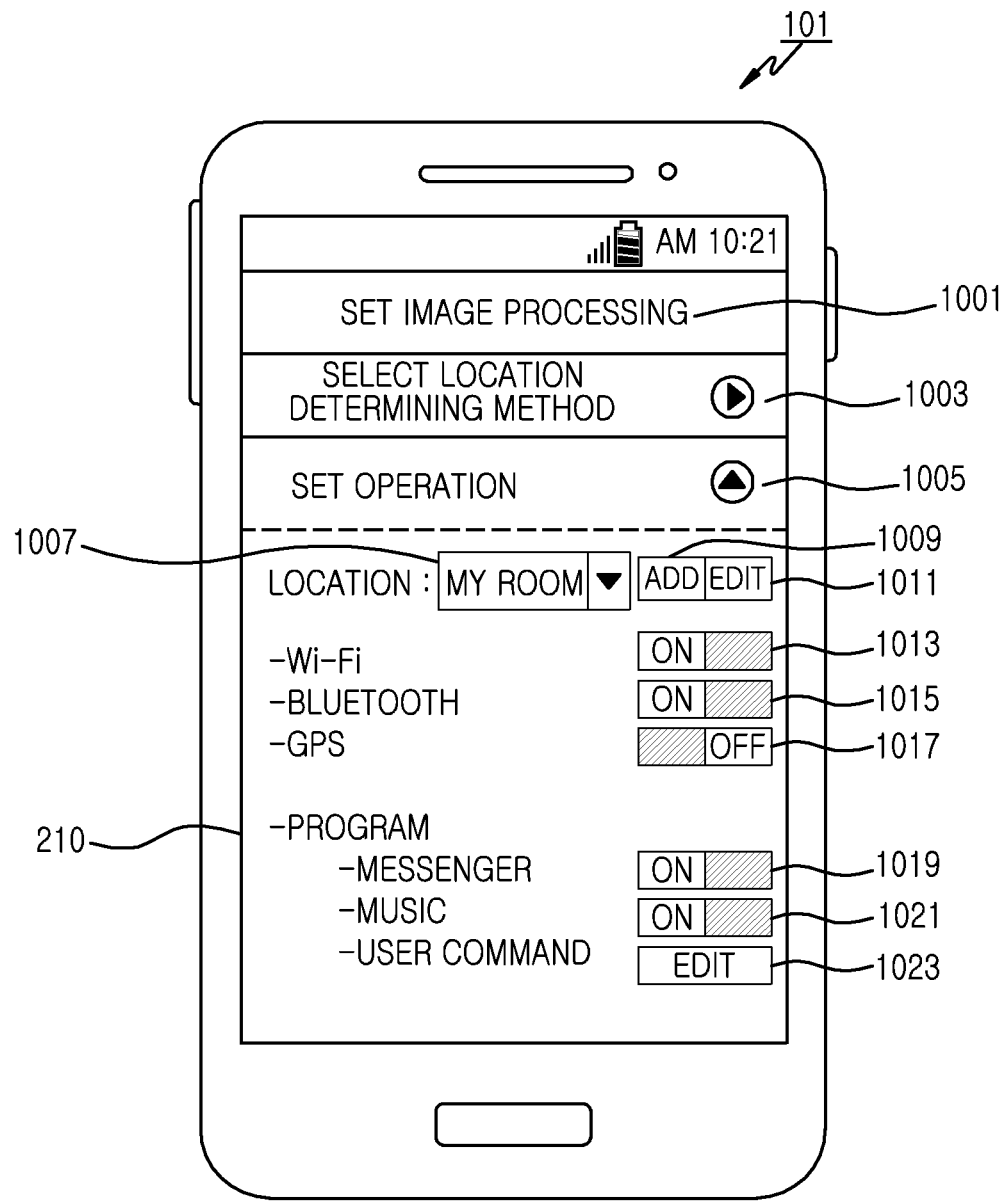
FIG. 10 illustrates configuring at least one function of an electronic device to be performed in response to a location of the electronic device determined by setting information of the electronic device, according to an embodiment of the present invention.

FIG. 10 illustrates configuring at least one function of an electronic device 101 to perform in response to a location of the electronic device 101 in setting information of the electronic device 101, according to an embodiment of the present invention.

According to an embodiment of the present invention, through a menu "select location determining method" 1003 of setting information 1001, the electronic device 101 may determine an image acquired through the camera 280 thereof as a means for determining a place where the electronic device 101 is located. The electronic device 101 may designate at least one place through setting information 1001 and when the electronic device 101 is located at a designated place, may configure at least one operation thereof to be controlled. According to an embodiment of the present invention, the electronic device 101 may provide a menu 1007 to determine a location thereof. The electronic device 101 may provide a menu (e.g., an icon 1009) to add a place. The electronic device 101, when determining a location 1007 thereof as "my room," may provide a menu 1011 to configure a reference image that is used to determine a place where the electronic device 101 is located as "my room." According to an embodiment of the present invention, the electronic device 101, when determining "my room" as a place where the electronic device 101 is located, may provide a menu 1013 for turning on/off Wi-Fi, a menu 1015 for turning on/off Bluetooth, or a menu 1017 for turning on/off GPS. According to an embodiment of the present invention, when determining a place where the electronic device 101 is located as "my room" through setting information 1001, the electronic device 101 may provide a menu 1019 for determining whether to execute, for example, a messenger program as a control program, a menu 1021 for determining whether to execute a music program, or a menu 1023 for executing a designated instruction by determining at least one program according to a user selection. In cases where the electronic device 101 determines a place where the electronic device 101 is located as "my room" based on at least one image acquired through the camera 280, the electronic device 101 may turn on Wi-Fi and Bluetooth and execute a messenger program and a music program based on the menus of FIG. 10.

Figure 11A:
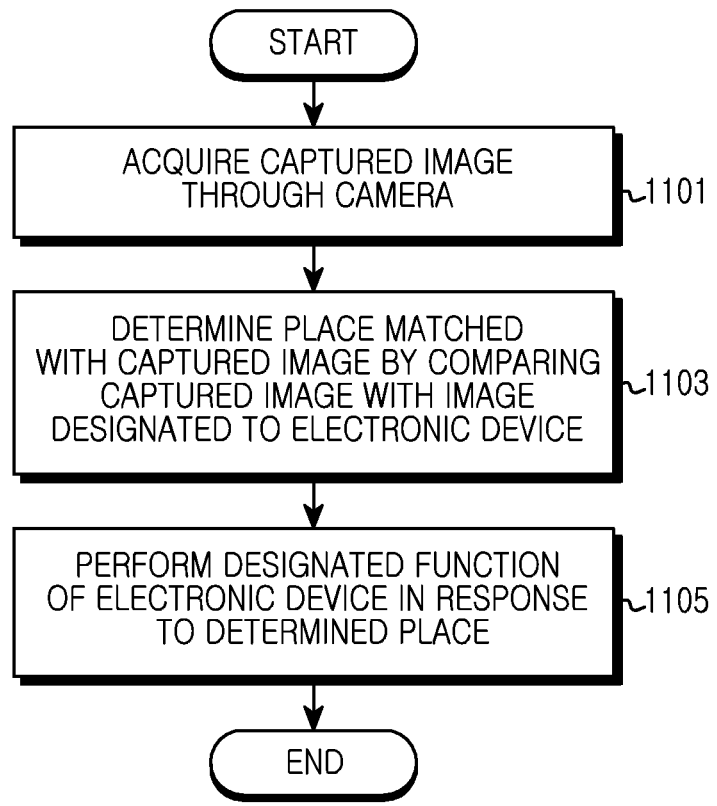
FIGS. 11A and 11B are flowcharts of a method of performing a designated function in response to a place determined based on an acquired image in an electronic device, according to an embodiment of the present invention.
Figure 11B:
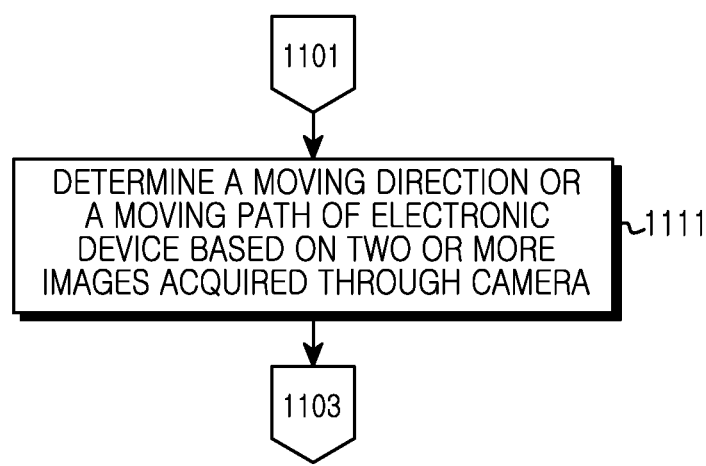

FIGS. 11A and 11B are flowcharts illustrating a method of performing a designated function in response to a place determined based on an acquired image in an electronic device 101, according to an embodiment of the present invention.

According to an embodiment of the present invention, in step 1101, the electronic device 101 acquires at least one image through the camera 280 included therein or functionally connected thereto. In the acquisition of the image through the camera 280, the electronic device 101 may acquire at least one image at a time when detecting a designated input or a particular object. In the capturing of the image, the electronic device 101 may acquire a first image and may capture an image at a designated time interval and/or for a designated number of times. According to an embodiment of the present invention, the electronic device 101 may acquire at least one image acquired through the camera 280 in real time.

According to an embodiment of the present invention, in step 1103, the electronic device 101 compares at least one image acquired through the camera 280 with images designated by setting information of the electronic device 101 to determine a place where the electronic device 101 is located. According to an embodiment of the present invention, the electronic device 101 may detect at least one object included in the image acquired through the camera 280 and determine an image matching the detected object among the images designated by the setting information of the electronic device 101. In response to a matched image, the electronic device 101 determines a place designated by the setting information as the place where the electronic device 101 is located. According to an embodiment of the present invention, the electronic device 101 compares at least one object included in the image acquired through the camera 280 and the composition in which the object is disposed in the image with designated images included in the setting information of the electronic device 101 to determine a place corresponding to at least one matched image as the place where the electronic device 101 is located.

According to an embodiment of the present invention, in step 1105, the electronic device 101 performs a function thereof designated in response to a place where the electronic device 101 is located, based on the setting information. According to the setting information corresponding to the determined place, the electronic device 101 may turn on or off at least one device included therein or functionally connected thereto or execute a designated program. Through a designated network communication, the electronic device 101 may be connected to another electronic device designated in response to the place determined based on the acquired image. In addition, when detecting that a designated instruction is input, the electronic device 101 executes the instruction input in response to the determined place.

According to an embodiment of the present invention, the electronic device 101 may determine a place where the electronic device 101 is located based on the image acquired through the camera 280 and determine a distance between at least one object detected from the image and the electronic device 101. When it is determined that the distance between the electronic device 101 and the designated object is less than a distance designated by the setting information of the electronic device 101, the electronic device 101 may perform a function designated by the setting information.

According to an embodiment of the present invention, the electronic device 101 may terminate the operation of FIG. 11A after performing step 1105.

Hereinafter, various embodiments of the present invention will be described with reference to FIG. 11B.

According to an embodiment of the present invention, step 1111 may be performed after step 1101 of FIG. 11A. According to an embodiment of the present invention, in step 1111, the electronic device 101 determines a moving direction or a moving path of the electronic device 101 based on two or more images acquired through the camera 280. According to an embodiment of the present invention, the electronic device 101 may determine a distance between the electronic device 101 and a designated object based on the same object included in the two or more acquired images and determine a direction in which the electronic device 101 moves based on the determined distance.

According to another embodiment of the present invention, the electronic device 101 may determine a moving direction of the electronic device 101 in response to a sequence in which a first object included in a first image and a second object included in a second image acquired after the first image are designated by the setting information of the electronic device 101 based on at least one image acquired through the camera 280.

The electronic device 101 may perform step 1103 of FIG. 11A after performing step 1111. In step 1103, the electronic device 101 may determine a place where the electronic device 101 is located with reference to a moving direction of the electronic device 101 determined based on the two or more acquired images.

The electronic device 101 may terminate the operation of FIG. 11B after performing step 1111.

According to an embodiment of the present invention, a method of an electronic device 101 may include acquiring at least one captured image, determining a place corresponding to the captured image by comparing the captured image with at least one designated stored image, and performing at least one function in response to the determined place. According to an embodiment of the present invention, acquiring a captured image may include capturing an image at a time when detecting a certain object. According to an embodiment of the present invention, acquiring a captured image may include capturing two or more images at a designated time interval. According to an embodiment of the present invention, acquiring a captured image may include capturing at least one of images captured in real time. According to an embodiment of the present invention, comparing a captured image with at least one designated stored image may include comparing at least one object detected from the captured image with the stored image. According to an embodiment of the present invention, comparing at least one object may include comparing at least one of a shape of the object, a feature point of the object, a form in which the at least one object is disposed, and a color of the object with the stored image. According to an embodiment of the present invention, determining a matched place may include determining a moving path of the electronic device 101 based on a change in a distance between the electronic device 101 and designated objects detected from two or more captured images. According to an embodiment of the present invention, performing at least one function may include controlling at least one, designated in response to a place, among functions corresponding to Wi-Fi, Bluetooth, GPS, a program, and an input instruction. According to an embodiment of the present invention, performing at least one function may include connecting the electronic device 101 to another designated electronic device through a designated network communication. According to an embodiment of the present invention, the method may further include inputting a designated instruction and transmitting, to another electronic device, data for requesting the other electronic device to execute the input instruction.

Although the electronic device 101 acquires two or more images by capturing them at a designated time interval in the above description, the electronic device 101, without being limited thereto, may use the two or more captured images in various ways. According to an embodiment of the present invention, the electronic device 101 may capture an image whenever moving a designated distance based on the location information thereof, or may acquire two or more captured images at a designated distance interval by capturing an image every time it is determined that the electronic device 101 has moved a designated distance, based on the photographing region of the camera module 280.

According to an embodiment of the present invention, the electronic device 101 can easily identify a place where the electronic device 101 is located by utilizing an image acquired through the camera and information relating to the image.

According to an embodiment of the present invention, the electronic device 101 can perform a function configured in response to a designated place, thereby providing convenience to an operation of configuring a user environment.

Methods, according to various embodiments of the present invention, disclosed in claims and/or the present disclosure may be implemented in the form of hardware, software, or a combination thereof.

In cases where the methods are implemented in the form of software, a non-transitory computer readable storage medium may be provided for storing one or more programs (e.g. software modules). One or more programs stored in the non-transitory computer readable storage medium are configured to be executed by one or more processors in an electronic device 101. The one or more programs may include instructions for allowing the electronic device 101 to carry out the methods, according to the various embodiments of the present invention, disclosed in the claims and/or the present disclosure.

Various embodiments of the present invention may be performed by using one or more programs included in the memory 230 of the electronic device 101, or may be directly controlled by a processor (e.g., the processor 220). In addition, the embodiments of the present invention may also be controlled by using one or more control modules. One or more control modules may be controlled by the processor.

The programs (e.g. software modules or software) may be stored in a Random Access Memory (RAM), a non-volatile memory including a flash memory, a Read Only Memory (ROM), an Electrically Erasable Programmable ROM (EE- PROM), a magnetic disc storage device, a Compact Disc-ROM (CD-ROM), a Digital Versatile Disc (DVD) or other types of optical storage devices, or a magnetic cassette. Alternatively, the programs may be stored in a memory configured with a combination of all or some thereof. In addition, a plurality of constituent memories may also be included.

The programs may be stored in an attachable storage device that is accessible through a communication network, such as the Internet, the Intranet, a Local Area Network (LAN), a Wide LAN (WLAN), or Storage Area Network (SAN), or a communication network configured with a combination thereof. The storage devices may be connected to an electronic device through an external port. In addition, a separate storage device in a communication network may also be connected to a portable electronic device.

The term "module" as used in the present disclosure may refer to, for example, a unit including one of hardware, software, and firmware or any combination of two or more of them. The term "module" may be interchangeably used with a term, such as "unit," "logic," "logical block," "component," or "circuit." The term "module" may refer to the smallest unit of an integrated component or a part thereof. The term "module" may refer to the smallest unit that performs one or more functions or a part thereof. The term "module" may refer to being mechanically or electronically implemented. For example, the term "module" according to the present disclosure may include at least one of an Application-Specific Integrated Circuit (ASIC), a Field-Programmable Gate Array (FPGA), and a programmable-logic device for performing certain operations, which are now known or may be developed in the future.

According to an embodiment of the present invention, at least some of the devices (for example, modules or functions thereof) or the method (for example, operations) according to the present invention may be implemented by a command stored in a non-transitory computer-readable storage medium in a programming module form. When a command is executed by one or more processors (for example, the processor 110), the one or more processors may execute a function corresponding to the command. The non-transitory computer-readable storage medium may be, for example, the memory 130. At least a part of the programming module may be implemented (for example, executed) by, for example, the processor 110. At least a part of the programming module may include, for example, a module, a program, a routine, a set of instructions and/or a process for performing one or more functions.

Any of the modules or programming modules according to an embodiment of the present invention may include at least one of the above described elements, exclude some of the elements, or further include other additional elements. The operations performed by the modules, programming module, or other elements according to an embodiment of the present invention may be executed in a sequential, parallel, repetitive, or heuristic manner. Further, some operations may be executed according to another order or may be omitted, or other operations may be added.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices configured to store and perform a program instruction (for example, a programming module), such as a Read Only Memory (ROM), a Random Access Memory (RAM), a flash memory, and the like. In addition, the program instructions may include high level language codes, which can be executed in a computer by using an interpreter, as well as machine code generated by a compiler. The aforementioned hardware device may be configured to operate as one or more software modules in order to perform the operation of the present invention, and vice versa.

Certain embodiments of the present invention shown and described in the present disclosure and the accompanying drawings correspond to certain embodiment of the present invention presented to easily describe technical contents of the present invention and to facilitate comprehension of the present invention, and are not intended to limit the scope of the present invention. Therefore, it should be construed that all modifications or modified forms drawn by the technical idea of the present invention in addition to the embodiments disclosed herein are included in the scope of the present invention, as defined by the appended claims and their equivalents.

What is claimed is:

1. A method of an electronic device attachable to a part of a body of a user, the method comprising:
    acquiring, by a camera of the electronic device, a plurality of images on an object, wherein the plurality of images comprises a first image and a second image that are respectively acquired on different locations of the electronic device at a designated time interval;
    identifying, by at least one processor of the electronic device based on acquiring the plurality of images, first information regarding the object included in the first image and second information regarding the object included in the second image, wherein the first information and the second information are associated with at least one of a shape of the object, a feature point of the object, a color of the object, a form in which the object is disposed, or a distance between the electronic device and the object;
    determining, by the at least one processor of the electronic device by comparing the first information and the second information, a moving path and direction of the electronic device;
    determining, by the at least one processor of the electronic device based on the moving path and direction of the electronic device, a target location of the electronic device, wherein information on the target location has been stored in the electronic device; and
    changing, by the at least one processor of the electronic device based on determining the target location of the electronic device, a mode of the electronic device selected among a plurality of modes for the electronic device, wherein the changed mode has been mapped to the target location.

2. The method of claim 1, wherein acquiring the plurality of images comprises acquiring the plurality of images in response to detecting at least one designated object,
    wherein information on the at least one designated object has been stored.

3. The method of claim 1, wherein acquiring the plurality of images comprises acquiring the plurality of images based on at least one of a distance between the object and the electronic device, or a moved distance of the electronic device based on the detected value of global positioning system (GPS).

4. The method of claim 1,
    wherein the first image is associated with the object in a first direction, and
    wherein the second image is associated with the object in a second direction.

5. The method of claim 1, further comprising:
identifying, based on identifying the first information and second information, the distance between the electronic device and the object; and
determining, in response to identifying that the distance is less than a reference distance, the target location of the electronic device as the location associated with the object.

6. The method of claim 1, wherein comparing the first information and the second information comprises:
comparing at least one shape of the object with at least one designated object; and
identifying the object based on the comparison.

7. The method of claim 1, wherein identifying the first information and the second information comprises identifying a change from the object on the first image to the object on the second image.

8. The method of claim 1, further comprising displaying, by the electronic device, a designated application for controlling at least one device comprised in the target location.

9. The method of claim 1, wherein changing the mode of the electronic device comprises changing at least one of a setting of wireless fidelity (Wi-Fi), a setting of bluetooth (BT), or a setting of GPS.

10. An electronic device attachable to a part of a body of a user, comprising:
a camera;
a memory storing instructions; and
at least one processor, coupled to the camera and the memory, configured to:
acquire a plurality of images on an object, wherein the plurality of images comprise a first image and a second image that are respectively acquired on different locations of the electronic device at a designated time interval;
identify, based on acquiring the plurality of images, first information regarding the object included in the first image and second information regarding the object included in the second image, wherein the first information and the second information are associated with at least one of a shape of the object, a feature point of the object, a color of the object, a form in which the object is disposed, or a distance between the electronic device and the object;
determine a moving path and direction of the electronic device by comparing the first information and the second information;
determine, based on the moving path and direction of the electronic device, a target location of the electronic device, wherein information on the target location has been stored in the memory; and
change, based on determining the target location of the electronic device, a mode of the electronic device selected among a plurality of modes for the electronic device, wherein the changed mode has been mapped to the target location.

11. The electronic device of claim 10, wherein the at least one processor is configured to acquire the plurality of images in response to detecting at least one designated object,
wherein information on the at least one designated object has been stored.

12. The electronic device of claim 10, wherein the at least one processor is configured to acquire the plurality of images based on at least one of a distance between a designated object and the electronic device, or a moved distance of the electronic device based on the detected value of global positioning system (GPS).

13. The electronic device of claim 10,
wherein the first image is associated with the object in a first direction, and
wherein the second image is associated with the object in a second direction.

14. The electronic device of claim 10, wherein the at least one processor is configured to:
identify, based on identifying the first information and second information, the distance between the electronic device and the object; and
determine, in response to identifying that the distance is less than a reference distance, the target location of the electronic device as the location associated with the object.

15. The electronic device of claim 11, wherein the at least one processor is configured to:
compare at least one shape of the object with at least one designated object; and
identify the object based on the comparison.

16. The electronic device of claim 10, wherein the at least one processor is configured to identify a change from the object on the first image to the object on the second image.

17. The electronic device of claim 10, wherein the at least one processor is further configured to display a designated application for controlling at least one device comprised in the target location.

18. The electronic device of claim 10, wherein the at least one processor is further configured to change the mode of the electronic device by changing at least one of a setting of wireless fidelity (Wi-Fi), a setting of bluetooth (BT), or a setting of GPS.

* * * * *